United States Patent
Klausmann et al.

[11] Patent Number: 6,085,011
[45] Date of Patent: Jul. 4, 2000

[54] METAL FIBER END SLEEVE FOR A FLEXIBLE FIBER OPTIC LIGHT GUIDE AND METHOD FOR PRODUCING SAME

[75] Inventors: Christoph Klausmann, Wackernheim; Wolfgang Eis, Oberjosbach; Sigurd Dressler, Wiesbaden, all of Germany

[73] Assignee: Schott Glas, Mainz, Germany

[21] Appl. No.: 09/120,754

[22] Filed: Jul. 22, 1998

[30] Foreign Application Priority Data

Jul. 25, 1997 [DE] Germany ............ 197 32 051

[51] Int. Cl.⁷ .................................................. G02B 6/04
[52] U.S. Cl. ..................... 385/115; 385/120; 385/57; 385/60
[58] Field of Search ........................ 385/115, 116, 385/120, 121, 57, 60, 62, 66, 72, 78, 81, 84, 87

[56] References Cited

U.S. PATENT DOCUMENTS 3,681,164  8/1972  Bazinet et al. .
5,222,180  6/1993  Kuder et al. ................. 385/115

FOREIGN PATENT DOCUMENTS

| 2 632 218 | 6/1988 | France . |
| 1 464 646 | 4/1970 | Germany . |
| 104 922 | 4/1974 | Germany . |
| 36 20 368 C2 | 12/1987 | Germany . |
| 197 32 051 C1 | 7/1998 | Germany . |
| 1 595 163 | 1/1978 | United Kingdom . |

Primary Examiner—Phan T. H. Palmer
Attorney, Agent, or Firm—Millen, White, Zelano & Branigan

[57] ABSTRACT

Fiber end sleeve for fiber optic bundle and a method for the production of a metal end sleeve for a flexible fiber-optic light guide are provided. The method includes the steps of inserting a fiber bundle into a metal sleeve, and using a magnetic pulse-forming apparatus for deforming said metal sleeve radially inward onto said fiber bundle.

25 Claims, 3 Drawing Sheets

METAL FIBER END SLEEVE FOR A FLEXIBLE FIBER OPTIC LIGHT GUIDE AND METHOD FOR PRODUCING SAME

BACKGROUND OF THE INVENTION

1. Field of the Invention

The present invention relates in general to a metal fiber end sleeve and a method for the production of the metal end sleeve for a flexible fiber-optic light guide or optical fiber bundle.

2. Description of the Background Art

A flexible fiber-optic light guide is defined as a guide that contains one or more optical fibers that are bundled together within an outer jacket. For example, several hundred individual fibers can be contained in such a light guide. In a complete transmission system, it is necessary to couple such guides both to one another and also to devices. The light guide, also called a fiber-optic bundle, must therefore be terminated by an optical coupler. A fiber-optic light guide is therefore generally terminated with an end sleeve.

From DE 36 20 368 C2, it is known to push a glass tube section onto the end of an optical fiber bundle, to melt this glass tube section over a defined length by heating, and thus to shrink it onto the fiber bundle as the glass tube collapses. Very good fiber end sleeves are produced with this method, but its technically extraordinarily exacting and time-consuming implementation is a drawback to the method.

From GB 1 595 163 is known the production of a fiber end sleeve that is made of thermoplastic material, in which a sleeve that is made of a suitably molded thermoplastic and thermally bonded material is shrunken onto the fiber bundle end by means of pressure and at the same time is welded to the sleeve of the light guide. The disadvantage to such a fiber end sleeve is its low thermal resistance.

From U.S. Pat. No. 3,681,164 a metal fiber end sleeve is known in which the end of the fiber bundle is cemented or glued to the sleeve with an inorganic silicate cement, a solder glass, or a litharge (PbO)-glycerine cement. In this cementing or gluing of the fiber bundle into a sleeve (gluing with other organic adhesives, e.g., epoxide resin, is also known), very great care must be taken, and only skilled personnel can produce qualitatively good fiber end sleeves. Moreover, the disadvantage exists that even this method is very time-consuming. Furthermore, complete alignment between the individual fibers often is not possible; as a result, a loss of light can occur over the coupled pair of such end sleeves.

SUMMARY OF THE INVENTION

In view of the above, an object of the invention is to provide a metal fiber end sleeve and an improved method for the production of a metal end sleeve for a flexible fiber-optic light guide containing a fiber bundle, wherein the method is implemented without cementing or glueing.

Upon further study of the specification and appended claims, further objects and advantages of this invention will become apparent to those skilled in the art.

According to a preferred embodiment of the invention, a metal sleeve is pushed onto the optical fiber bundle wrapped in a layer of elastic material, particularly onto its end, then, the metal sleeve is pressed and shrunken around the fiber bundle by a magnetic pulse-forming method.

Magnetic pulse-forming is a deformation technique that has been known since the 1960s, which is also referred to as fast magnetic forming, magnetic deformation, or electro-magnetic forming. Magnetic pulse-forming is an electrodynamic high-speed deformation method in which the metal workpieces are cold-formed with the aid of powerful magnetic field surges that act without contact. In the method, a condenser-discharge current flows into a cylindrical coil that contains the sleeve to be pushed onto the bundle. The forces that act on the workpiece are directed radially inward and force the sleeves together or onto the end of the optical fiber bundle that is located in the sleeve. Suitable devices are described in, for example, DE-AS 14 64 646, DD-PS 104922 or FR-PS 2 632 218. A description of the method in the art is found in W. Dahl, Umformtechnik, Plastomechanik und Werkststoffkunde [Deformation Technique, Plastomechanics and Materials Science], Springer Verlag, Berlin, Hamburg, New York, 1993, pages 916–921. Devices for magnetic pulse-forming are commercially available (e.g., Maxwell Company, USA).

BRIEF DESCRIPTION OF THE DRAWINGS

The foregoing and other objects, features, and advantages of the invention will be apparent from the following more particular description of preferred embodiments as illustrated in the accompanying drawings, in which reference character refers to the same parts throughout the various views. The drawing are not necessarily to scale, emphasis instead being placed upon illustrating principles of the invention.

In the accompanying drawings.

DETAILED DESCRIPTION OF THE PREFERRED EMBODIMENTS

In the figures, the same parts have the same reference numbers.

Figure 1:
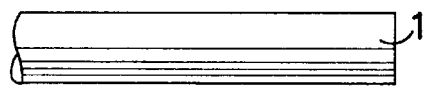
FIGS. 1–6: diagrammatically show the production method in partial steps
Figure 2:
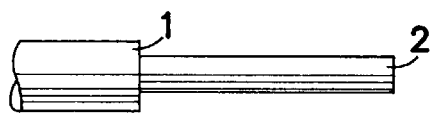

FIG. 1 shows the end of a glass fiber guide that consists of outer jacket 1 and the fiber bundle on the inside. To apply the sleeve, outer jacket 1 is partially peeled back, and fiber bundle 2 is exposed (FIG. 2).

The metal sleeve that is to be shrunken can now be pushed onto this fiber bundle 2. It is preferred, however, to surround the fiber bundle first with a layer of elastic material. The jacket of the fiber bundle with a layer of elastic material has the advantage in that a stable resilience is produced between the sleeve and the fiber bundle. For the elastic material, numerous substances with an elastic property can used, e.g., rubber, natural and synthetic rubber, chlorinated rubber, cyclized rubber, styrene-butadiene-copolymers (SBR), acryl-butadiene-copolymers (NBR), butyl rubber, polyolefins, polyurethanes, fluoroelastomers such as vinylidene fluoride and chlorotrifluoroethylene copolymers, acryl rubber, polychloroprenes, polysulfides, silicone rubber, polytetrafluoroethylene, etc.

The elastic material is coiled as a foil or tape around the exposed fiber bundle, but it can also be applied as a layer, e.g., as a suspension. It is also possible to provide the material as an inner coating of the metal sleeve that is to be shrunken. In addition, the outer jacket of the fibers or of the fiber bundle, if it has elastic properties, can be used as an elastic jacket. In this case, it is not necessary to remove the outer jacket. The outer jacket is generally comparatively thick since it must protect the fibers or the fiber bundle on the inside from external damage or cracking. If especially thin end sleeves are desired, the outer jacket is generally removed. Covering of the fiber bundle with a tape or a foil is preferred since the fiber bundle is thereby held together, which makes it easier to slip on the sleeve. The outer jacket of the fiber bundle generally has a thickness of about 0.05 to 1 mm. Preferred is a jacket with a thickness of 0.05 to 0.2 mm, which can be easily achieved by covering the fiber bundle with one or more layers of a suitable plastic tape.

The selection of a suitable plastic is made primarily based on the temperature stability requirements of the fiber end sleeve. In the case of more stringent requirements, tapes, foils, or coatings of fluorocarbon resins, especially polytetrafluoroethylene (PTFE), are used. Tapes that often contain fluorocarbon resins can also be used advantageously, as are now readily available for sealing screwed connections and the like in plumbing work instead of the previously commonly used hemp fibers or pipe dope.

Figure 3:

FIG. 3 shows the end of a glass fiber guide in which the glass fiber bundle is covered and held together with teflon tape. The teflon tape was coiled in an overlapping manner and had a width of 10 mm and a thickness of 0.03 mm.

Figure 4:
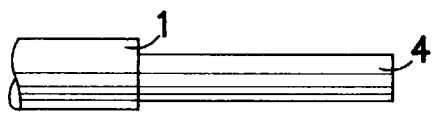

In FIG. 4, metal sleeve 4 that is to be shrunken is now pushed onto the end of the glass fiber bundle encasing the glass fiber bundle as shown in FIG. 3.

As for the type of metal for the metal sleeve, all sufficiently ductile metals and metal alloys are suitable, i.e., metals that can be suitably deformed. As metals, aluminum and its alloys, copper and its alloys, especially brass and bronze, iron, steel, high-grade steel, and nickel and its alloys are preferred. These metals and alloys are especially suitable because of good electric conductivity are aluminum and its alloys as well as copper and its alloys.

As generally known, metals or alloys that are poor conductors place more stringent requirements on the deforming equipment. If the sleeve is made of a metal or an alloy, e.g., high-grade steel, which is more difficult to deform because of its poorer electric conductivity, it is common practice to surround the sleeve with a layer of metal that conducts well, e.g., aluminum or copper. For this purpose, it is already known to surround the object that is to be deformed with an aluminum foil. In this case, a few (1 to 3) coils that are made of an aluminum foil with a thickness of about 0.03 mm, as is also used to wrap food at home, are sufficient. Covering with a layer that is 0.03 to 0.1 mm thick and that is made of aluminum or copper foil is the simplest method. After deformation, the foil can be removed.

The metal sleeves are usually used with a wall thickness of 0.1 to 3 mm. For this purpose, aluminum sleeves (pipe sections) are the most suitable since they can be deformed especially easily. The metal sleeves can be deformed to a very large extent. To ensure an economical method, however, it is suitable for the sleeves to have an inside diameter that is about 0.5 to 1 mm larger than the outside diameter of the fiber or fiber bundle onto which the sleeve is to be pressed. Inside this area, the sleeve has enough play that it can easily be pushed onto the fiber bundle; moreover, the amount of deformation work to be done is small enough that it is possible to complete the deformation very quickly. If the metal sleeve is pushed onto the guide far enough to where the guide must be split, two end sleeves can be produced in a single operation.

Figure 5:
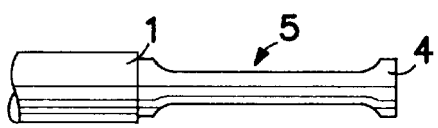

Since metal sleeve 4 is pushed onto the fiber bundle, it is pressed onto the fiber bundle in a system for magnetic pulse deformation. FIG. 5 shows metal sleeve 4, which is pushed in area 5 onto fiber bundle 2 or the end of the fiber bundle that is covered with PTFE tape 3.

Figure 6:
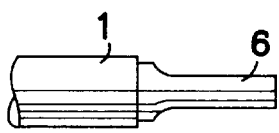
Figure 7:
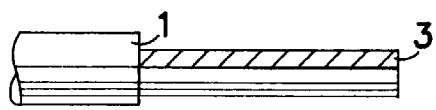
FIGS. 7–10: show another embodiment

FIG. 5 shows an embodiment in which only the middle area of metal sleeve 4 is deformed. For the production of the fiber end sleeves, as shown in FIG. 6, the excess of the pushed-on metal sleeve is cut off, and the end of fiber end sleeve 6 that is thus produced is surface-finished in a way that is known in the art.

Figure 8:
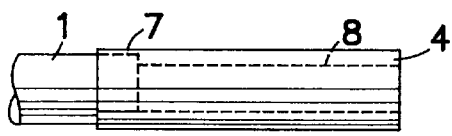
Figure 9:
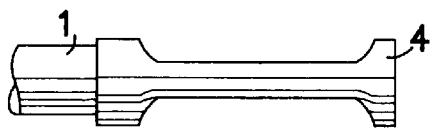
Figure 10:
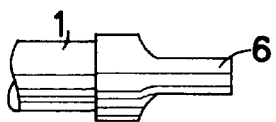

FIGS. 7 to 10 show another embodiment that is analogous to FIGS. 3 to 6, with the difference that the metal sleeve is pushed to overlap the outside jacket before deformation, as shown in FIG. 8. In dotted lines, No. 7 shows the end of jacket 1 that is concealed under the metal sleeve, and No. 8 also shows, in dotted lines, the end of the fiber bundle that is covered with PFTE tape 3, concealed under the metal sleeve. After magnetic pulse forming, metal sleeve 4 is connected both to cladding 1 of the fiber bundle and to the fiber bundle itself, as shown in FIG. 9, thus producing an especially tensile fiber end sleeve according to FIG. 10.

Figure 15:
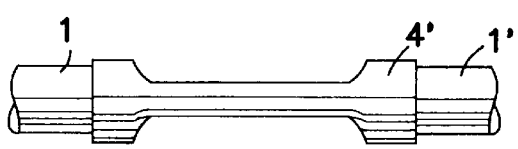
Figures 16, 17:
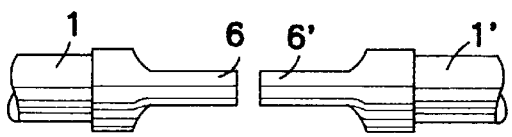

In FIGS. 13 to 17, the production of two end sleeves in a single operation analogously to FIGS. 7–10 is shown. The fiber guide is removed from its outer jacket, and the pushed-on fiber bundle is covered with an elastomer tape 3. Then, metal sleeve 4 is pushed over the two ends of guide cladding 1 and 1' and deformed, as shown in FIG. 15. After splitting, two end sleeves 6 and 6' (FIGS. 16 and 17) are obtained. The production of two end sleeves in a single operation is especially economical.

Figure 11:
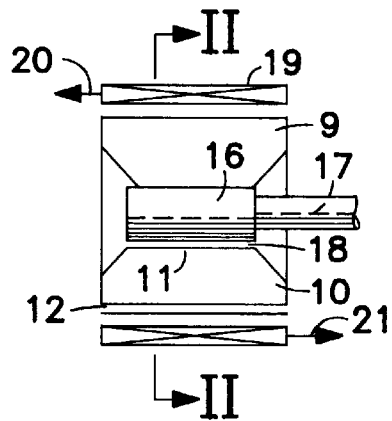
FIG. 11: shows roughly diagrammatically a device for magnetic pulse-forming
Figure 12:
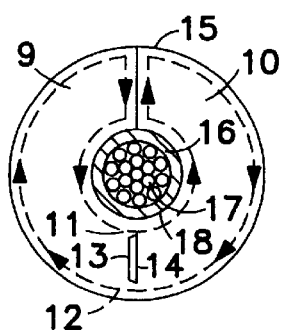
FIG. 12: shows the section along II—II of FIG. 2
Figure 13:
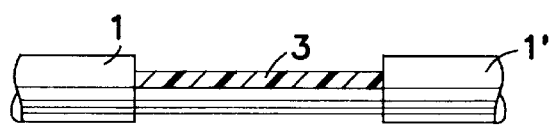
FIGS. 13–17: shows the production of two end sleeves in a single operation.
Figure 14:
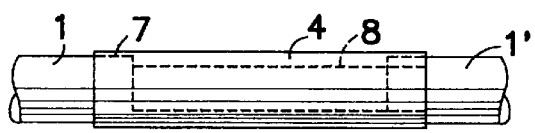

FIGS. 11 and 12 show a known, separable magnetic field concentrator that consists of two parts 9 and 10. The electric contact between parts 9 and 10 of the separable magnetic field concentrator is produced by mutual contact of projections 11 and 12, which are formed from recess 13 in part 9 of the separable concentrator and face 14 of concentrator part 10. On the lower side, an insulating intermediate layer 15 that is glued to part 9 is provided between connected parts 9 and 10 of the separable concentrator.

A fiber bundle 17 with pushed-on metal sleeve 16 that is made of aluminum is inserted into the separable magnetic field concentrator, whereby aluminum sleeve 16 is to be pressed onto the fiber bundle. Aluminum sleeve 16 is isolated from parts 9 and 10 of the separable concentrator by means of an elastic sleeve 18, which is cut along its side line and consequently can be easily mounted and removed. The separable magnetic field concentrator is placed in an electric winding 19, which is equipped with connections 20 and 21, together with inserted aluminum sleeve 16 and fiber bundle 10. Such a magnetic field concentrator operates as follows:

A current pulse is fed to connections 20 and 21 of winding 19, whose magnetic field induces currents in the separable magnetic field concentrator in the direction that is indicated in FIG. 12 by arrows. When recess 13 is present in part 9 of the separable concentrator, these currents flow through projection 11 and surface 14 near the opening with inserted aluminum sleeve 16 and fiber bundle 17. The pulse-like magnetic field that is produced in the opening of the separable concentrator presses aluminum sleeve 16 against fiber bundle 17. Since the currents flow from part 9 into part 10 of the separable concentrator near the opening surface, the magnetic pressure is uniformly distributed onto aluminum sleeve 10, thus ensuring that the pressing is carried out very uniformly and with high quality.

In the case of inducer arrangements with separable magnetic field concentrators as shown in FIGS. 11 and 12, means must be provided that make it possible to press parts 9 and

10 of the separable concentrator against one another and thus to ensure a more reliable electric contact release. These means are not shown in the diagrammatic illustration of FIGS. 11 and 12, however. It is also advantageous if the contact surfaces of concentrator parts 9 and 10 are coated with a layer of material that has high electric conductivity and good corrosion resistance.

It is extraordinarily surprising that, despite the high forces of up to 500 MPa and the high deformation rates of the metal sleeve wall of up to 300 meter per second that occur in magnetic pulse-forming, a metal sleeve can be pressed onto a fiber or a fiber bundle without the sensitive glass fibers being damaged in the method. The optimum pulse intensity that is necessary for pressing any fiber end sleeve can be easily determined by anyone skilled in the art by routine experimentation, i.e. a few tests. With the method, very reliable metal fiber end sleeves can be produced in a quick and simple way. After the excess aluminum sleeve is removed, the end of the fiber end sleeve need only be polished, which is greatly facilitated by the fact that there is little or no organic substance present from the covering, in contrast to the conventional metal fiber end sleeves in which the fiber bundle is cemented with an organic adhesive. The presence of larger quantities of organic substances exerts a lubricating action during polishing, so that polishing is comparatively expensive and time-intensive. If the sleeve is applied to a split in the fiber guide, two fiber end sleeves thus are produced during splitting. This approach makes optimum use of the aluminum sleeve. No waste is produced.

Without further elaboration, it is believed that one skilled in the art can, using the preceding description, utilize the present invention to its fullest extent. The following examples are, therefore, to be construed as merely illustrative, and not limitative of the remainder of the disclosure in any way whatsoever.

EXAMPLES

Example 1

A length of 10 mm of an end of a fiber bundle, having a 4.2 mm diameter and containing 3000 single fibers, was wrapped with 6 to 8 turns of a Teflon tape having a thickness of 0.03 mm and a width of 10 mm. An aluminum sleeve, having an internal diameter of 4.8 mm, a wall thickness of 0.8 mm and a length of 10 mm, was pushed over this wrapped end. A magnetic pulse forming machine, made by Maxwell of USA and rated with a maximum voltage of 5 KiloVolts (KV), was set to 2.45 KV and the sleeve was compressed onto the fiber bundle by a pulse of 10–30 $\mu$s (microseconds) 220 Ws (Watt second) of energy (work).

Example 2

An end of a fiber bundle having a 2 mm diameter is provided with a copper sleeve having a length of 10 mm, an internal diameter of 2.2 mm and a wall thickness of 0.6 mm. The Maxwell magnetic pulse forming machine was set to 2.25 KV and the sleeve was compressed onto the end of the fiber bundle by a pulse of 10–30 $\mu$s of 220 Ws of energy.

Example 3

An end of a fiber bundle having a 1.2 mm diameter surrounded by a Polyvinylchloride (PVC) sheath (outer jacket) having a thickness of 0.5 mm was provided with a brass sleeve having a length of 10 mm, a wall thickness of 0.5 mm arid an internal diameter of 2.3 mm. The Maxell magnetic pulse forming machine was set to 2.15 KV and the sleeve was compressed onto the fiber bundle by a pulse of 10–30 $\mu$s and 200 Ws of energy.

Example 4

Example 1 was repeated with a nickel-chromium steel (V2A) sleeve instead of the aluminum sleeve. The nickel-chromium steel sleeve has a wall thickness of 0.4 mm and an internal diameter of 4.8 mm. Because of the poor conductivity of nickel chromium alloy, the sleeve was wrapped in three turns of common household aluminum foil. The aluminum foil has a thickness of 0.03 mm. The power of the Maxwell magnetic pulse forming machine was set to 2.5 KV, and the sleeve was compressed by a pulse of 10–30 $\mu$s and 260 Ws of energy onto the fiber bundle. Thereafter, the aluminum foil was removed from the sleeve.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope of thereof, can make various changes and modifications of the invention to adapt it to various usages and conditions.

The full disclosure content of all applications, patents, and publications cited above, and of corresponding German application 197 32051.1-51, are hereby incorporated into this application by reference.

While the invention has been particularly shown and described with reference to a preferred embodiment thereof, it will be understood by those skilled in the art that various changes in form and details may be made therein without departing from the spirit and scope of the invention.

What is claimed is:

1. A method for fixing a fiber end sleeve on a flexible fiber optic light guide which includes a fiber optic bundle, comprising; inserting the fiber bundle into a metal sleeve; and deforming said metal sleeve radially inward onto said fiber bundle by applying a magnetic pulse thereto.

2. The method according to claim 1, wherein the fiber bundle is a glass fiber bundle and the method further comprises placing a layer of elastic material between said metal sleeve and said glass fiber bundle prior to deforming said metal sleeve.

3. The method according to claim 2, comprising deforming said sleeve in a middle section of said metal sleeve.

4. The method according to claim 2, wherein arranging a layer of elastic material comprises covering said glass fiber bundle with a tape of elastic material.

5. The method according to claim 2, wherein the metal sleeve has an inside surface and arranging a layer of elastic material comprises coating the inside surface of the metal sleeve with said layer of elastic material.

6. The method according to claim 3, wherein said layer of elastic material as selected from a group of materials consisting of fluorocarbon polymers and polyethylene.

7. The method according to claim 2, further comprising wrapping a conductive metal foil around said metal sleeve prior to deformation; and removing said metal foil after deformation.

8. The method according to claim 1, wherein inserting the fiber bundle into the metal sleeve comprises inserting an end of said fiber bundle into said metal sleeve.

9. The method according to claim 1, wherein said metal sleeve includes an inner surface coated with elastic material.

10. A fiber end sleeve for a glass fiber bundle having an outer jacket and at least one end stripped of the outer jacket exposing the glass fiber bundle, comprising:

an elastic layer covering said at least one end of the glass fiber bundle;

a magnetically compressed metal sleeve formed onto said at least one end of the glass fiber bundle by magnetic pulse forming apparatus; said elastic layer being sandwiched between said at least one end of the glass fiber bundle and said magnetically compressed metal sleeve.

11. The fiber end sleeve according to claim 10, wherein said metal sleeve overlaps the outer jacket of the glass fiber bundle such that the outer jacket is partially concealed within said metal sleeve.

12. The fiber end sleeve according to claim 11, wherein said elastic material is selected from the group consisting of natural rubber, synthetic rubber, chlorinated rubber, cyclized rubber, a styrene-butadiene-copolymer (SBR), an acrylic-butadiene-copolymer (NBR), a butyl rubber, a polyolefine, a polyurethane, a flouroelastomer, vinylidene flouride, achlorotriflouroethylene copolymer, an acrylic rubber, a polychloroprene, a polysulfide, a silicone rubber, and polytetraflouroethylene (PTFE).

13. The fiber end sleeve according to claim 10, wherein the glass fiber bundle has an outer diameter, and said metal sleeve has an inner diameter; said inner diameter of said metal sleeve is about 0.5 mm to 1 mm larger than said outer diameter of the glass fiber bundle.

14. The fiber end sleeve according to claim 10, wherein said elastic layer is a coating applied to an inner surface of said metal sleeve.

15. The fiber end sleeve according to claim 10, wherein said elastic layer is a layer of elastic tape wrapped around said at least one end of the glass fiber bundle which has been exposed.

16. The fiber end sleeve according to claim 10, further comprising an outer metal foil around said metal sleeve, said metal foil having a higher conductivity than said metal sleeve.

17. The fiber end sleeve according to claim 10, wherein said metal sleeve has a wall thickness of 0.1 mm to 3 mm.

18. A fiber end sleeve for a glass fiber bundle having an outer jacket and at least one end stripped of the outer jacket exposing an end portion of the fiber bundle, comprising:

an elastic layer covering said end portion of the glass fiber bundle;

a metal sleeve covering said elastic layer covering at least one end of the fiber bundle.

19. The fiber end sleeve according to claim 18, wherein said metal sleeve has a wall thickness of 0.1 mm to 3 mm.

20. The fiber end sleeve according to claim 18, wherein the glass fiber bundle has an outer diameter, and said metal sleeve has an inner diameter; said inner diameter of said metal sleeve is about 0.5 mm to 1 mm larger than said outer diameter of the glass fiber bundle.

21. The fiber end sleeve according to claim 18, wherein said elastic layer is a coating applied to an inner surface of said metal sleeve.

22. The fiber end sleeve according to claim 18, further comprising an outer metal foil around said metal sleeve, said metal foil having a higher conductivity than said metal sleeve.

23. The fiber end sleeve according to claim 18, wherein said elastic material is selected from the group consisting of natural rubber, synthetic rubber, chlorinated rubber, cyclized rubber, a styrene-butadiene-copolymer (SBR), an acrylic-butadiene-copolymer (NBR), a butyl rubber, a polyolefine, a polyurethane, a flouroelastomer, vinylidene flouride, achlorotriflouroethylene copolymer, an acrylic rubber, a polychloroprene, a polysulfide, a silicone rubber, and polytetraflouroethylene (PTFE).

24. A fiber end sleeve for a jacketed glass fiber bundle having an outer jacket end portion and an exposed glass fiber end portion, comprising:

a metal sleeve compressed onto the exposed end portion of the glass fiber bundle; and overlapping the outer jacket end portion.

25. The fiber end sleeve according to claim 24, wherein said metal sleeve is a magnetically compressed metal sleeve which is compressed onto the exposed glass fiber end portion of the fiber bundle using a magnetic pulse-forming apparatus.

* * * * *